United States Patent
Wang et al.

(10) Patent No.: US 12,342,334 B2
(45) Date of Patent: Jun. 24, 2025

(54) DETECTION OF GROUP MEMBERSHIP FOR COORDINATED CONNECTIVITY

(71) Applicant: Verizon Patent and Licensing Inc., Basking Ridge, NJ (US)

(72) Inventors: Carl Wang, Syosset, NY (US); Sudhir Korrapati, Acton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/441,020

(22) Filed: Feb. 14, 2024

(65) Prior Publication Data

US 2024/0188066 A1    Jun. 6, 2024

Related U.S. Application Data

(63) Continuation of application No. 17/314,109, filed on May 7, 2021, now Pat. No. 11,956,770.

(51) Int. Cl.
*H04W 72/121* (2023.01)
*H04W 24/02* (2009.01)
*H04W 24/10* (2009.01)
*H04W 60/06* (2009.01)

(52) U.S. Cl.
CPC ........ *H04W 72/121* (2013.01); *H04W 24/02* (2013.01); *H04W 24/10* (2013.01); *H04W 60/06* (2013.01)

(58) Field of Classification Search
CPC ... H04W 72/121; H04W 24/02; H04W 24/10; H04W 60/06
USPC ......................................................... 370/329
See application file for complete search history.

(56) References Cited

U.S. PATENT DOCUMENTS

| | | | |
|---|---|---|---|
| 10,433,248 B2 | 10/2019 | Wang et al. | |
| 2005/0262382 A1 | 11/2005 | Bain | |
| 2011/0029622 A1 | 2/2011 | Walker et al. | |
| 2012/0120845 A1* | 5/2012 | Perras .................. | H04W 8/186 370/254 |
| 2013/0297693 A1 | 11/2013 | Miller et al. | |
| 2021/0219108 A1 | 7/2021 | Tramiel et al. | |

* cited by examiner

*Primary Examiner* — Gbemileke J Onamuti

(57) ABSTRACT

One or more computing devices, systems, and/or methods are provided. In an example, a group member list is received in a device, and a group reporting schedule is received in the device. Reporting data is communicated by the device using the group reporting schedule. A group exit message is sent by the device responsive to determining a group exit condition associated with failing to detect communications from group members specified in the group member list.

20 Claims, 10 Drawing Sheets

US 12,342,334 B2

DETECTION OF GROUP MEMBERSHIP FOR COORDINATED CONNECTIVITY

RELATED APPLICATION

This application claims priority to and is a continuation of U.S. Application Ser. No. 17/314,109, filed on May 7, 2021, entitled "DETECTION OF GROUP MEMBERSHIP FOR COORDINATED CONNECTIVITY", which is incorporated by reference herein in its entirety.

BACKGROUND

Internet of Things ("IoT") technology refers to a wide range of physical objects or devices that have specific defined functions, such as asset tracking. IoT devices may collect sensor data associated with an asset and report the collected data over a network. Network providers have established low power wireless networks to support IoT device communication, such as Long-Term Evolution, Category M1 (LTE CAT-M1) networks. A localized central device manager is provided to enable grouping of IoT devices for power management and coordination of reporting activities to enhance IoT low power wireless network.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION OF EXAMPLE EMBODIMENTS

Figure 1:
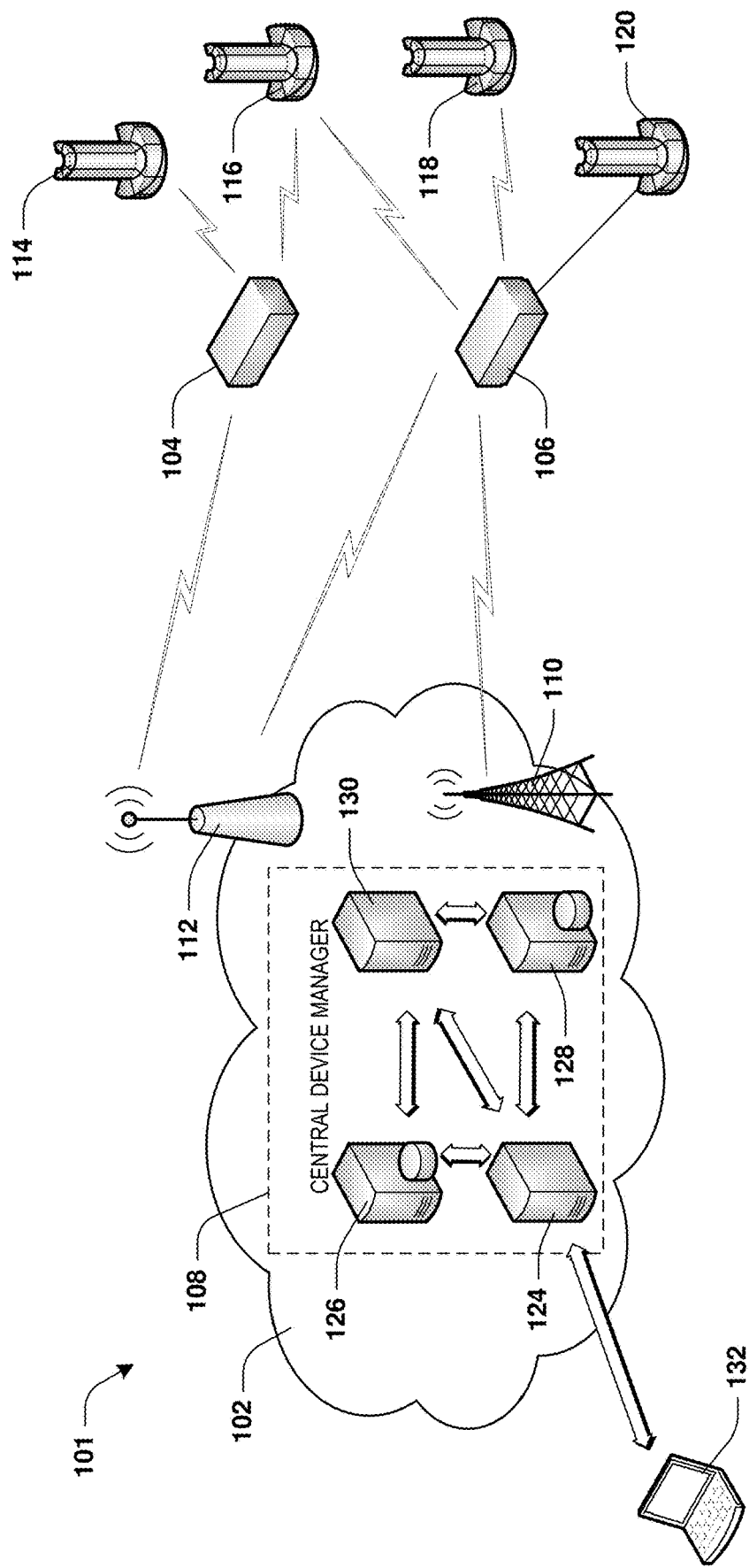
FIG. 1 is a diagram illustrating an example system implementing group membership detection for coordinated connectivity.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

The following provides a discussion of some types of computing scenarios in which the disclosed subject matter may be utilized and/or implemented.

One or more systems and/or techniques for detecting group membership for coordinated connectivity are provided. Reducing power consumption associated with higher-energy processing states, such as transmitting states for communicating status or sensor data on the network, can extend operational battery life. However, the goal of prolonging operational life is balanced against the goal of meeting specifications for periodically transmitting data on the wireless network.

Massive deployment of cellular connectivity based asset management devices builds up a competition for cellular connectivity when large quantity of mobile assets are closely located. Due to finite network resources for simultaneous data upload, techniques to reduce the number of network access requests generated per connected IoT device in a particular service area, such as a single cell, can reduce network load.

Electronics are embedded within IoT devices or user equipment (UE) to enable wired and/or wireless network connectivity that allows IoT devices to collect, store, and exchange data. Short-range network personal area network (PAN) connectivity includes, for example, Bluetooth™ and/or Bluetooth™ Low Energy (BLE) connectivity. Long-range network connectivity includes, for example, Wi-Fi and/or cellular network connectivity.

An asset tracker device is a type of IoT device that interfaces with an external peripheral device, such as a sensor, to collect data related to an asset in addition to on-device build in sensors. The asset may be a piece of equipment, a manufacturing line, an item being transported, or some other suitable asset. For example, the asset tracker device may collect and report temperature, pressure, humidity, light, acceleration, vibration, shock, orientation, location (e.g., latitude and longitude, altitude), an image, or some other parameter regarding the asset. In a manufacturing environment, the asset tracker device allows flexible sensor placement and reporting. In a transport environment, the asset tracker device facilitates monitoring of the asset to validate proper handling or storage conditions to allow certification of asset quality at delivery. In some embodiments, the asset tracker device includes one or more internal sensors for collecting data. The asset tracker device periodically reports the collected data over the network to a data store. A user associated with the asset tracker device may receive the data from the data store or may be automatically alerted if the collected data violates a predetermined threshold. An asset tracker device may periodically scan for its associated peripheral devices to validate link connectivity. For example link validation scans may be conducted for devices implementing a Bluetooth Low Energy (BLE) protocol.

To extend operational life and reduce network congestion, the central device manager identifies groups of associated devices and assigns communication schedules to members of the group to reduce the number of communications and stagger the timing. The group communication schedules may be different than the default schedule for the device programmed by its user. In some embodiments, the central device manager sends a modified schedule and a group member list to each of the devices in a designated group. When a particular device is no longer near its assigned group, such as from movement of the device or movement of the other devices in the group, the central device manager will attempt to reassign the device to a different group to coordinate connectivity of the device over the network.

Accordingly, as provided herein, the PAN communications are utilized by a device to locally detect its neighbors and verify its membership in an assigned group. An asset tracker can identify nearby devices by passively listening to the link validation messages between other asset trackers and their associated peripheral devices, obviating the need for the asset tracker to directly connect to or communicate with its neighbors to identify their proximity. Inter-device communication on the PAN can be conducted at the same rate or same or, typically, at a higher rate than the main network. Due to the higher PAN communication rate compared to the network communication rate, local group detection enables the devices to detect group membership changes more quickly than the group membership changes can propagate through the network to the central device manager. Rather than relying on the central device manager to identify that the device has left the group based on location information reported with its data, the device can locally detect the change in group membership and communicate the change directly to the central device manager to allow assignment of a new group. Local group membership detection increases the efficiency of group management and coordinated connectivity.

FIG. 1 is a diagram illustrating a network environment 101 implementing group membership detection for coordinated connectivity over a communication network 102. Asset tracker devices 104, 106 connect with the communication network 102 to communicate with a central device manager 108. FIG. 1 illustrates exemplary network connectivity architectures in which the asset tracker devices 104 may be configured to access the communication network 102, such via a cellular base station 110 or a wireless access point (WAP) 112. In some embodiments, the base station 110 comprises an evolved Node B (eNB) that operates according to one or more versions of the LTE communication standard.

In some embodiments, the communication network 102 includes one or more networks of various types including, for example, a public land mobile network (PLMN), such as (e.g., a code division multiple access (CDMA) 2000 PLMN, a global system for mobile communications (GSM) PLMN, an LTE PLMN and/or other types of PLMNs), a satellite mobile network, a telecommunications network (e.g., public switched telephone networks (PSTNs)), a wired and/or wireless local area network (LAN), a wired and/or wireless wide area network (WAN), a metropolitan area network (MAN), an intranet, the Internet, or a cable network (e.g., an optical cable network). In one implementation, the communication network 102 may include a PLMN or satellite mobile network connected to the Internet. In another implementation, the communication network 102 may include a fixed network (e.g., an optical cable network) connected to the Internet.

In some embodiments, each asset tracker device 104, 106 is an IoT device having computational and communicative capability, with various installed software (e.g., applications), and also includes or is configured to connect to one or more of various types of sensors via a PAN connection or a hardwired connection. For example, the asset tracker device 104 communicates with sensors 114, 116 via wireless connections, and the asset tracker device 106 communicates with sensors 116, 118 via wireless connections and with sensor 120 via a wireline connection. In some embodiments, the sensors 114, 116, 118 communicate via a BLE protocol. In some embodiments, the sensors measure one or more parameters, such as temperature, pressure, humidity, vibration, shock, location (e.g., latitude and longitude, altitude), an image, or some other parameter. Note that the asset tracker devices 104, both communicate with the sensor 116.

According to some embodiments, the asset tracker devices 104, 106 communicate with a central device manager 108. The central device manager 108 may include one or more servers 124, 126, 128, 130 and may operate in a cloud network. In some embodiments, the asset tracker devices 104, 106 comprise communication interfaces for connecting to the communication network 102. The asset tracker devices 104, 106 may connect to remote servers at scheduled times for reporting data. In some embodiments, the central devices manager 108 sends reporting configuration data to the asset tracker devices 104, 106 to avoid reporting overlap or redundancy.

In some embodiments, the asset tracker devices 104, 106 communicate over the network 102 using a network topology such as, for example, a low power wide area network (LPWAN) radio access network (RAN), a Third Generation (3G) RAN, a Fourth Generation (4G) RAN, a Fifth Generation (5G) RAN, a category M1 ("Cat-M1"), a Long Term Evolution (LTE) ("LTE-M") network, or other some suitable network.

According to some embodiments, the asset tracker devices 104, 106 include software for LTE-M network-enabled, low power wireless connectivity, such that the asset tracker devices 104, 106 are configured to be "controlled" and/or "managed" remotely across the network 102 (e.g., LTE) infrastructure.

In the network environment 101 of FIG. 1, the central device manager 108 comprises a user access portal server 124, a device monitoring setting database 126, a device reporting data database 128, and a reporting management server 130. Other structures and configurations of the central device manager 108 are within the scope of the present disclosure. A user device 132 associated with an administrator or operator interfaces with the user access portal server 124 to allow data retrieval or device configuration. In some embodiments, the base station 110 and/or the WAP 112 serves as an access point for the asset tracker devices 104, 106 (e.g., via LTE-M), and the base station 110 and/or the WAP 112 forwards one or more communications via wired or wireless links to the central device manager 108. In some embodiments, the International Mobile Equipment Identity (IMEI) identifier of an asset tracker device 104, 106 becomes available when the asset tracker device 104, 106 attaches via the base station 110. The base station 110 and/or the WAP 112 employs the IMEI of the asset tracker device 104, 106 to direct packet data units transmitted from the asset tracker device 104, 106 to a destination node, such as the device reporting data database 128 and to direct packets, received from an originating and/or intermediary node, such as the reporting management server 130, to the asset tracker device 104, 106.

In some embodiments, the asset tracker device 104, 106 is designed for a specific function and may be embedded with electronics, memory storage, and communication interfaces that enable the asset tracker device 104, 106 to collect, store, and exchange data with other asset tracker devices 104, 106 or with certain network nodes. The asset tracker device 104, 106 may implement or more network connectivity protocols, such as, for example, Bluetooth™, Wi-Fi, and/or cellular network connectivity. According to some embodiments the asset tracker device 104, 106 is powered by a battery.

In some embodiments, the user device 132 may include a computation and communication device, such as a wireless mobile communication device that is capable of communicating with the communication network 102 to enable an operator to exchange data and/or to receive commands. For example, the user device 132 may include a cellular telephone; a personal communications system (PCS) terminal (e.g., that may combine a cellular telephone with data processing and data communications capabilities); a personal digital assistant (PDA); a smart phone; a laptop computer; a tablet computer; or another type of mobile computation and communication device. In some embodiments, the asset tracker device 104, 106 communicates via the Internet with the user access portal server 124, for example, to retrieve data collected by the asset tracker devices 104, 106 from the device reporting data database 128 or to send configuration data to the device monitoring setting database 126 to configure and/or update monitoring and/or reporting requirements associated with an asset tracker devices 104, 106.

In some embodiments, the reporting management server 130 stores geographical location information. For example, the geographical location information may include Cartesian coordinates, physical addresses, global positioning system (GPS) data, and/or map information, or some other suitable location data that identifies the locations of the asset tracker devices 104, 106.

In some embodiments, the device monitoring setting database 126 comprises one or more network devices that store monitoring requirements and/or reporting schedules for each asset tracker devices 104, 106 according to the network connection or access management service described herein. An asset tracker device 104, 106 that has "registered" includes a device whose owner, administrator and/or operator has subscribed to the network connection management service provided by the central device manager 108. A lookup may be performed in the device monitoring setting database 126 using an Internet Protocol (IP) address, an IMEI, or some other type of device identifier associated with the asset tracker device 104, 106 to verify registration of the asset tracker device 104, 106. In some embodiments, the device monitoring setting database 126 comprises multiple databases, for example, one for stationary devices and one for mobile devices.

In some embodiments, the device reporting data database 128 includes one or more network devices that store historical reporting data, such as sensor information, keep-alive signals, or other suitable reporting data, that are associated with a particular asset tracker device 104, 106. The device reporting data database 128 may be indexed with an identifier of the asset tracker device 104, 106, or with an IP address assigned to the user device 132, and used as a basis to retrieve one or more types of data stored in the device reporting data database 128. For example, in response to the user device 132 sending a query that includes a particular name associated with an asset tracker device 104, 106, the reporting management server 130 identifies a device identifier (ID) from the query and performs a lookup in device reporting data database 128 using the device ID to retrieve reporting data associated with the asset tracker device 104, 106.

In some embodiments, the reporting management server 130 includes functionality implemented in one or more network devices that include one or more processors configured to execute software functionality to perform processes described herein for implementing a network access management service that manages access for the asset tracker devices 104, 106 to increase operational life and/or to reduce network congestion. In some embodiments, other structures and configurations of the network environment 101 are within the scope of the present disclosure. The network environment 101 may include additional, fewer, or different components, or different arrangements of components.

Figure 2:
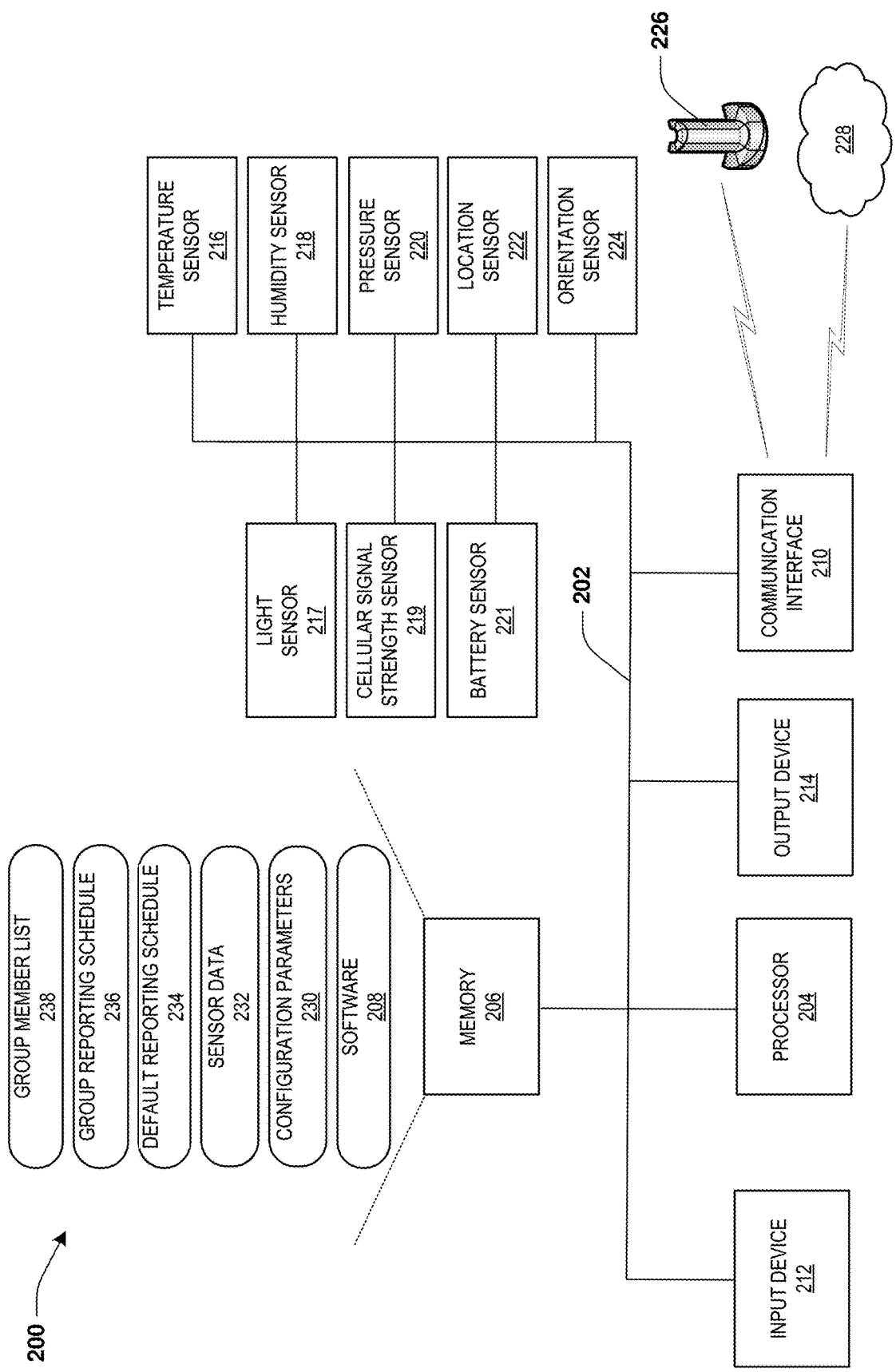
FIG. 2 is an illustration of a scenario involving an example asset tracker device that may utilize and/or implement at least a portion of the techniques presented herein.

FIG. 2 is a diagram illustrating exemplary components of an asset tracker device 200 that may correspond to one or more of the devices described herein. For example, the asset tracker device 200 may correspond to components included in the asset tracker devices 104, 106. The asset tracker device 200 comprises a bus 202, a processor 204, a memory 206 that stores software 208, a communication interface 210, an input device 212, and an output device 214. In some embodiments, the asset tracker device 200 comprises one or more internal sensors, such as a temperature sensor 216, a light sensor, 217, a humidity sensor 218, a cellular signal strength sensor 219, a pressure sensor 220, a battery sensor 221, a location sensor 222, an orientation sensor 224, or some other suitable sensor. In some embodiments, the orientation sensor comprises one or more of a gyroscope, accelerometer, magnetometer, compass, or other suitable sensor. In some embodiments, the asset tracker device 200 communicates over the communication interface 210 with an external sensor 226, such as one of the sensors 114, 116, 118, 120 in FIG. 1, using a PAN protocol and with a network 228, such as the network 102 in FIG. 1. According to other embodiments, the asset tracker device 200 may include fewer components, additional components, different components, and/or a different arrangement of components than those illustrated in FIG. 2 and described herein.

According to some embodiments, the bus 202 includes a path that permits communication among the components of asset tracker device 200. For example, the bus 202 may include a system bus, an address bus, a data bus, and/or a control bus. The bus 202 may also include bus drivers, bus arbiters, bus interfaces, clocks, and so forth. The processor 204 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. The processor 204 may be implemented as hardware (e.g., a microprocessor, etc.), a combination of hardware and software (e.g., a SoC, an ASIC, etc.), may include one or multiple memories (e.g., cache, etc.), etc.

In some embodiments, the processor 204 controls the overall operation or a portion of the operation(s) performed by the asset tracker device 200. The processor 204 performs one or multiple operations based on an operating system and/or various applications or computer programs (e.g., software 206). The processor 204 accesses instructions from the memory 206, from other components of asset tracker device 200, and/or from a source external to asset tracker device 200 (e.g., a network, another device, etc.). The processor 204 may perform an operation and/or a process based on various techniques including, for example, multi-threading, parallel processing, pipelining, interleaving, etc.

In some embodiments, the memory 206 includes one or multiple memories and/or one or multiple other types of storage mediums. For example, the memory 206 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other suitable type of memory. The memory 206 may include a hard disk, a magnetic disk, an optical disk, a magneto-optic disk, a solid state disk, a Micro-Electromechanical System (MEMS)-based storage medium, a nanotechnology-based storage medium, and/or some other suitable disk. The memory 206 may include drives for reading from and writing to the storage medium. The memory 206 may be external to and/or removable from asset tracker device 200, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). The memory 206 may store data, software, and/or instructions related to the operation of asset tracker device 200.

In some embodiments, the software 208 includes an application or a program that provides a function and/or a process. As an example, with reference to the reporting management server 130 of FIG. 1, the software 208 may include an application that, when executed by the processor 204, provides the functions of network connectivity management, as described herein. Similarly, the device monitoring setting database 126, the device reporting data database 128, and the reporting management server 130 may each include an application that, when executed by a processor, provides the functions described herein. For example, the asset tracker device 200 may dynamically adapt its reporting of sensor information to the reporting management server 130 based on a dynamic reporting schedule reconfiguration procedure described herein. The software 208 may also include firmware, middleware, microcode, hardware description language (HDL), an operating system, and/or other form of instruction.

The communication interface 210 permits the asset tracker device 200 to communicate with other devices, networks, systems, sensors, and/or the like. The communication interfaces 210 may include one or multiple wireless interfaces and/or wired interfaces. For example, the communication interface 210 may include one or multiple transmitters and receivers, or transceivers. The communication interface 210 may operate according to a protocol stack and a communication standard. In some embodiments, the communication interface 210 includes an antenna. The communication interface 210 may include various processing logic or circuitry (e.g., multiplexing/de-multiplexing, filtering, amplifying, converting, error correction, etc.). In some embodiments, the communication interface 210 operates in accordance with a first protocol for communicating with the network 228 and a second protocol for communicating with the external sensor 226. In some embodiments, the first protocol is a long-range wireless protocol, such as a cellular protocol or a WiFi protocol. In some embodiments, the second protocol is a short-range wireless protocol, such as a PAN protocol (e.g., Bluetooth™ and/or BLE).

In some embodiments, the input device 212 permits an input into asset tracker device 200. For example, the input 212 may comprise a keyboard, a mouse, a display, a touch-screen, a touchless screen, a button, a switch, an input port, speech recognition logic, and/or some other type of suitable visual, auditory, or tactile input component. The output device 214 permits an output from asset tracker device 200. For example, the output device 214 may include a speaker, a display, a touchscreen, a touchless screen, a light, an output port, and/or some other type of suitable visual, auditory, or tactile output component.

The asset tracker device 200 may perform a process and/or a function, as described herein, in response to processor 204 executing software 208 stored by the memory 206. By way of example, instructions may be written into the memory 206 from another memory (not shown) or read from another device (not shown) via the communication interface 210. The instructions stored by the memory 206 cause the processor 204 to perform a process described herein. Alternatively, for example, according to some embodiments, the asset tracker device 200 performs a process described herein based on the execution of hardware.

FIG. 2 illustrates various items that may be stored in the memory 206 to configure the operating parameters of the asset tracker device 200. For example, the memory 206 stores configuration parameters 230 for the asset tracker device 200, sensor data 232 collected from the internal sensors 216, 217, 218, 219, 220, 221, 222, 224 or the external sensor 226, a default schedule 234 for communicating with the central device manager 108, a group reporting schedule 236 for communicating with the central device manager 108 when the asset tracker device 200 is assigned to a group, and a group member list 238 identifying other members of the assigned group.

In some embodiments, the communication interface 210 receives messages from and/or sends messages to the reporting management server 130 via the base station 110 and/or the WAP 112. For example, the processor 204 may generate a service request for transmission resources for initiating data transmission to the network 228. According to another example, the processor 204 receives command and control signals from the reporting management server 130, for example, for receiving device configuration operations to be stored in the configuration parameters 230.

In some embodiments, a user specifies configuration data for the asset tracker device 200 for storing in the configuration parameters 230 and the default schedule 234 using the user device 132. The user device 132 interfaces with the user access portal server 124, which communicates the configuration data to the reporting management server 130. The reporting management server 130 sends the configuration data to the asset tracker device 200. Other paths may be used to send the configuration data, such as the user access portal server 124 sending the configuration data directly to the asset tracker device 200.

In some embodiments, the processor 204 generates data reporting messages using content, for example, retrieved from the sensor data 232 and forward the data reporting messages to the communication interface 210 for transmission to the central device manager 108 via the network 228. In some embodiments, the processor 204 employs the default schedule 234 or the group reporting schedule 236 for generating the sending the data reporting messages.

In some embodiments, the processor 204 monitors events associated with the sensor data 232 and manages the operation of the sensors 216, 217, 218, 219, 220, 221, 222, 224. For example, the processor 204 may direct one sensor 216, 217, 218, 219, 220, 221, 222, 224, 226 to provide one type of sensor data and direct another sensor 216, 217, 218, 219, 220, 221, 222, 224, 226 to provide another type of sensor data.

In some embodiments, the location sensor 222 identifies the location of asset tracker device 200 and/or the sensor 226 using global positioning system (GPS)/global navigation satellite system (GNSS) technology and determines location information, such as Cartesian coordinates (e.g., longitude, latitude, altitude), geographic information, and/or physical addresses associated with map information.

In some embodiments, the communication interface 210 periodically verifies link connectivity with the external sensor 226. The communication interface 210 sends a link validation message to the external sensor 226, and the external sensor 226 sends an acknowledgement message verifying its presence. In some embodiments, the asset tracker device 200 queries the external sensor 226 to retrieve collected sensor data or the external sensor 226 periodically pushes the collected sensor data to the asset tracker device 200. The link validation messages may be separate from or combined with sensor data messages.

Figure 3:
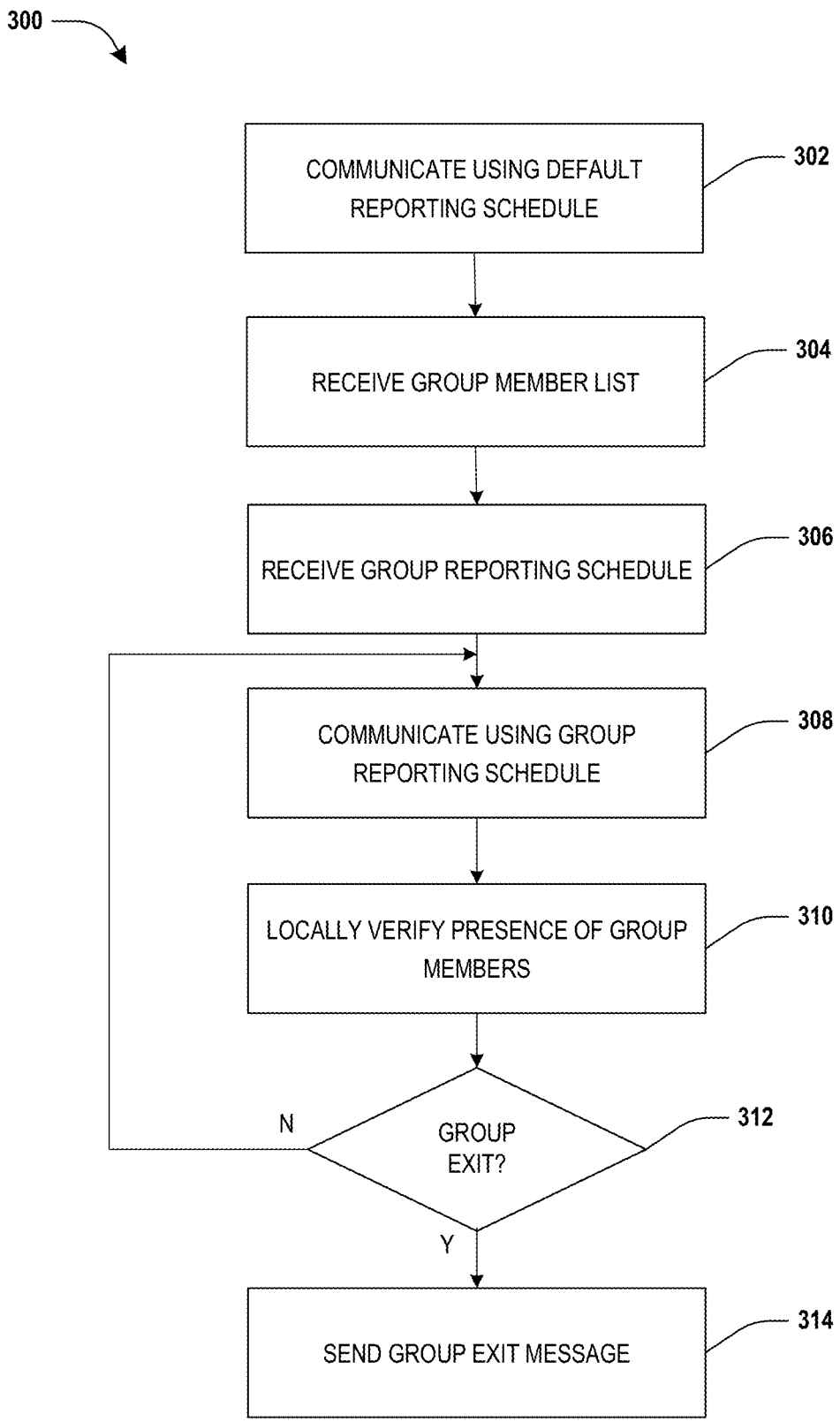
FIG. 3 is a flow chart illustrating an example method for group membership detection for coordinated connectivity.
Figure 4:
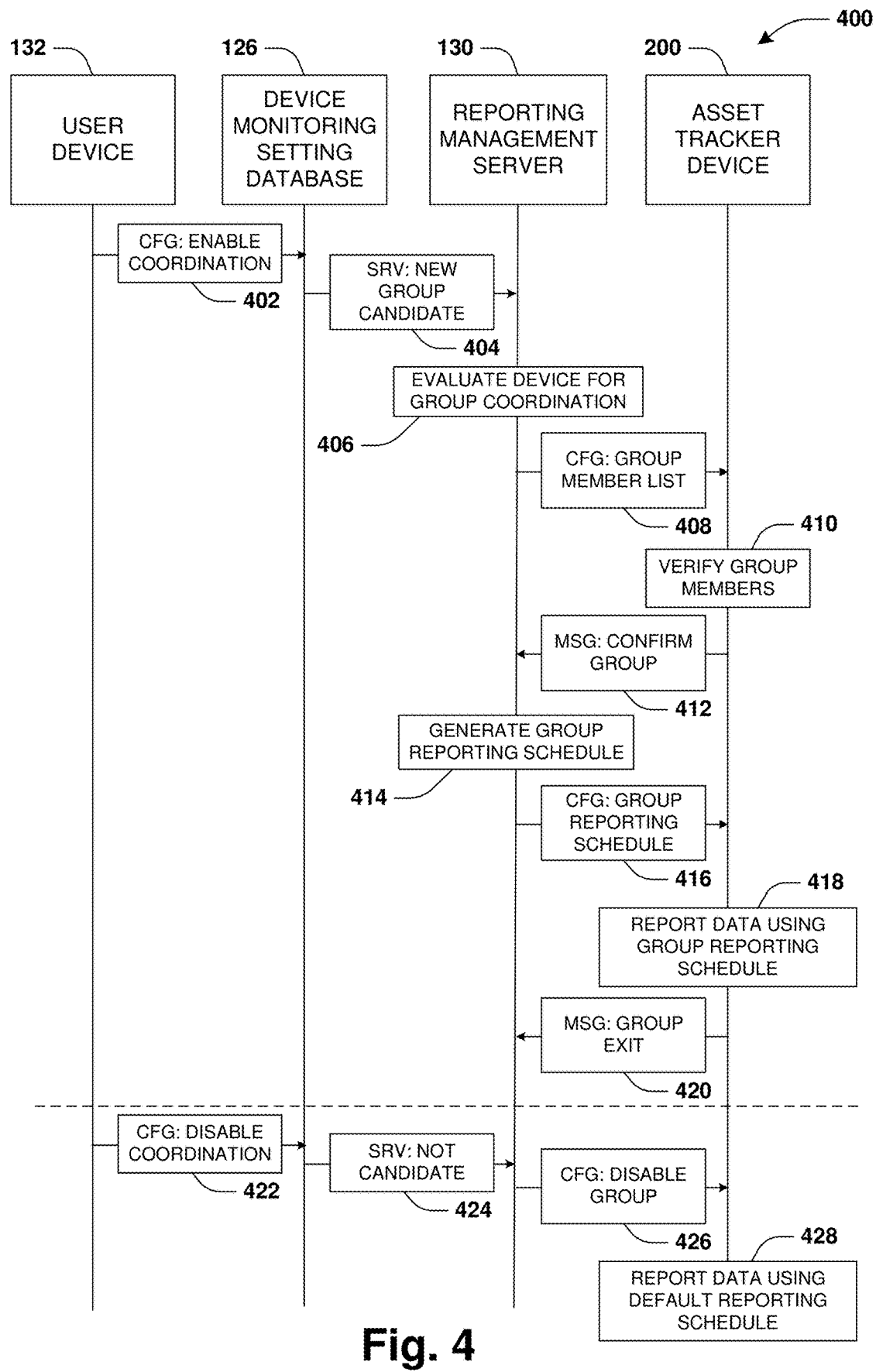
FIG. 4 is a diagram illustrating an example scenario associated with group membership management for coordinated connectivity.

FIG. 3 is a flow chart illustrating an example method 300 for group membership detection for coordinated connectivity. FIG. 4 is a diagram illustrating an example scenario 400 associated with group membership management for coordinated connectivity. Certain operations of the method 300 are described in reference to the scenario 400 of FIG. 4.

During operation 302 of the method 300, the asset tracker device 200 communicates data using the default schedule 234. In some embodiments, a user configures the default schedule 234 of the asset tracker device 200 via the user device 132 and the user access portal server 124. In some embodiments, the configuration parameters 230 and the default schedule 234 for the asset tracker device 200 are stored in the device monitoring setting database 126. In some embodiments, the default schedule 234 specifies time intervals at which the asset tracker device 200 transmits its reporting data, for example, identity and sensor data 232. In some embodiments, the asset tracker device 200 transmits the reporting data to the reporting management server 130 based on the default reporting schedule 230, and the reporting management server 130 forwards the reporting data to the device reporting data database 128.

In some embodiments, the user may receive the reporting data on demand by issuing a reporting data request from the user device 132 via the user access portal server 124. Responsive to the reporting data request, the user access portal server 124 retrieves the reporting data from the device reporting data database 128 and sends the reporting data back to the user device 132. In some embodiments, a direct data tunnel is configured to stream data from the device reporting data database 128 directly to the user device 132. In some embodiments, the asset tracker device 200 may flag certain reporting data as being critical based on one or more thresholds defined for the reporting data. Upon receiving flagged data, the reporting management server 130 pushes the flagged data to the user device 132 via the user access portal server 124 without waiting for a reporting data request from the user device 132. In some embodiments, an alarm service is enabled and an external action is taken in response to the alarm, such as generating a text message or e-mail message to a designated receiver as a notification that requires dedicated attention.

Referring to FIG. 4, the user may specifically configure the asset tracker device 200 to enable coordinated connectivity by sending a configuration message 402 from the user device 132 to the device monitoring setting database 126 or implicitly when the relevant device feature is enabled by the user configuration message. In response to receiving the configuration message 402, the device monitoring setting database 126 sends a service notification message 404 identifying the asset tracker device 200 identified by the configuration message 402 as a new group candidate.

At 406, the reporting management server 130 evaluates the asset tracker device 200 for group membership. To form a group of devices, the reporting management server 130 identifies asset tracker devices 200 in a common physical location. In some embodiments, the reporting management server 130 forms a group by identifying a group of asset tracker devices 200 accessing the network 102 via the same base station 110 or to the same WAP 112. In some embodiments, the reporting management server 130 forms a group based on physical locations of the asset tracker devices 200 as reported by location sensor 222 of each asset tracker device 200. In some embodiments, the group corresponds to asset tracker devices 200 in the same storage entity, such as a cargo container, a vehicle, a room, a building, or some other suitable storage entity. Other configurations of the group members are within the scope of the present disclosure. In some embodiments, the reporting management server 130 retrieves the configuration parameters 230 associated with each asset tracker device 200 from the device monitoring setting database 126 to identify monitoring and/or reporting requirements for each asset tracker device 200. In some embodiments, the configuration parameters 230 specify sensor data acquisition frequency, sensor data type, or other suitable configuration parameters. In some embodiments, the reporting management server 130 retrieves historical reporting data for each asset tracker device 200 from the device reporting data database 128.

Based on the monitoring and/or reporting requirements, the location information, and/or historical reporting data of the asset tracker devices 200, the reporting management server 130 determines whether power consumption and/or network access requests may be reduced for one or more of the asset tracker devices 200 without compromising the respective reporting requirements. Responsive to determining that altering a reporting schedule for one or more of the asset tracker devices 200 may reduce power consumption and/or network access requests the reporting management server 130 generates a group member list 238 and a group reporting schedule 236 for those asset tracker device 200 with reconfigured reporting configurations. The reporting management server 130 sends a configuration message 408 including the group member list 238 to the asset tracker device 200.

In response to receiving the configuration message 408, at 410 the asset tracker device 200 verifies the presence of the other asset tracker devices 200 specified in the group member list 238. In some embodiments, the asset tracker device 200 verifies the presence of the other asset tracker devices 200 by listening to the link validation messages communicated between the asset tracker device 200 and its associated external sensor 226. In some embodiments, the link validation messages are communicated over a PAN connection using the communication interface 210. Listening to the link validation messages allows the asset tracker device 200 to passively identify the presence of another asset tracker device 200 without having to actively send a message or receive an acknowledgement from the other asset tracker device 200. A passive approach conserves power in the asset tracker device 200 and reduces PAN traffic. In some embodiments, group presence is associated with the asset tracker device 200 detecting at least one of the asset tracker devices 200 in the group member list 238. In some embodiments, the number of group members detected to verify presence may be more than one.

Responsive to verifying the presence of the other asset tracker devices 200 specified in the group member list 238, the asset tracker device 200 sends a message 412 to the reporting management server 130 confirming the group verification. Although the reporting management server 130 knows the location of the asset tracker devices 200 based on the location information, the local verification at 410 confirms the members of the group are actually in the same communication space.

At 414, the reporting management server 130 generates a group reporting schedule 236 for asset tracker devices 200 specified in the group member list 238. In some embodiments, the reporting schedule is not modified for all members of the group. Accordingly, the reporting management server 130 only generates group reporting schedules 236 for the asset tracker devices 200 with modified reporting schedules. The reporting management server 130 sends a configuration message 416 including the group member list 238 to the asset tracker device 200.

Figure 5A:
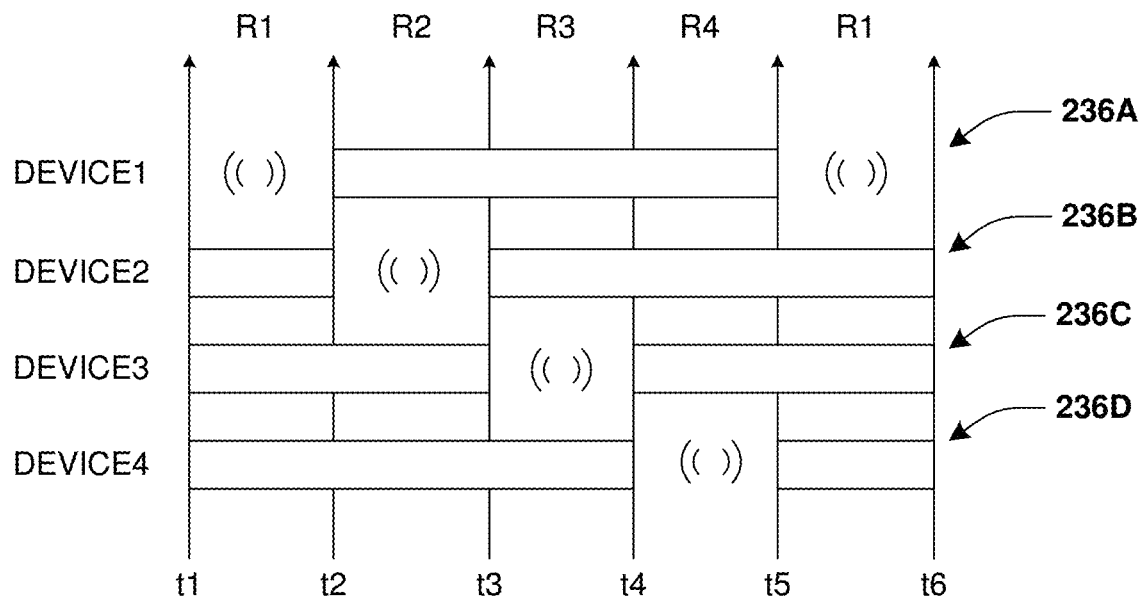
FIGS. 5A and 5B are diagrams illustrating group reporting schedules.
Figure 5B:
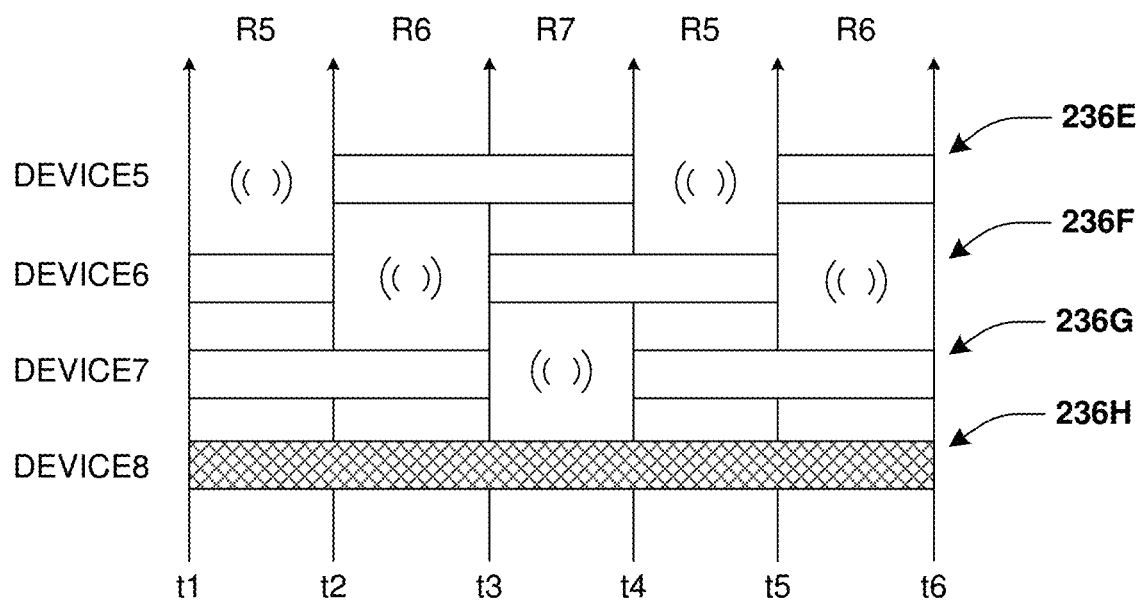

FIGS. 5A and 5B are diagrams illustrating group reporting schedules 236. In some embodiments, the reporting management server 130 generates the group member list 238 to reduce network congestion by staggering communications of the group members. FIG. 5A illustrates group reporting schedules 236A, 236B, 236C, 236D for four asset tracker devices 200 (DEVICES1-4). According to some embodiments, the group reporting schedules 236A, 236B, 236C, 236D are interleaved so that only one of the 200 asset tracker devices 200 reports during a particular time interval. As shown in FIG. 5A, DEVICE 1 reports between t1 and t2, DEVICE 2 reports between t2 and t3, DEVICE 3 reports between t3 and t4, and DEVICE 4 reports between t4 and t5. During time intervals between reporting events, the asset tracker devices 200 buffer the reporting data. For example, DEVICE 1 buffers its reporting data from t1-t5 and transmits the buffered reporting data between t5 and t6.

The asset tracker devices 200 are capable of invoking power saving functions by entering power saving mode (PSM) and/or extended discontinuous reception (eDRX) mode. In PSM, the asset tracker device 200 remains registered with the central device manager 108 on the communication network 102 with no need to re-attach or re-establish a packet data network (PDN) connection. While in the PSM, the asset tracker device 200, however, is not immediately reachable for mobile terminating services. More specifically, the asset tracker device 200 using PSM is available for mobile terminating services during a time that the device is in connected mode, and for a period of an "active time" after the connected mode. The connected mode is caused by a prescheduled wake-up and/or a device-originated event such as data transfer or signaling (e.g., in accordance with a periodic tracking area update (TAU) procedure). Thus, PSM may be used for an asset tracker device 200 that uses originating and terminating services infrequently, and these services are delay tolerant in that they can accept a corresponding latency in the mobile terminating communication.

Settings for eDRX may be negotiated between the asset tracker device 200 and the central device manager 108 and provided in the group reporting schedule 236 to reduce power consumption by the asset tracker device 200 while maintaining availability for mobile terminating data and/or network-originated procedures, within a certain delay that is dependent on the eDRX cycle value. The eDRX configuration allows an asset tracker device 200 to "sleep" for up to 10.24 s between paging cycles. In the eDRX mode, the group reporting schedule 236 defines how many "hyper frames" of 10.24 s, up to a maximum number configurable by the network operator, the asset tracker device 200 is to sleep before checking back in.

In some embodiments, the reporting management server 130 generates the group member list 238 to eliminate redundant reporting transmissions. For example, if multiple asset tracker devices 200 measure the same parameter or communicate with the same external sensor 226, only one of the asset tracker devices 200 needs to report the data. As illustrated in FIG. 1, the asset tracker device 104 and the asset tracker device 106 both communicate with the external sensor 116. In some embodiments, the members specified in the group member list 238 correspond to asset tracker devices 200 in a common storage entity, such as a cargo container, a vehicle, a room, a building, or some other suitable storage entity. If the environment in the storage entity is the same for all of the asset tracker devices 200, and some of the asset tracker devices 200 are configured to report the same sensed parameter, such as temperature, pressure, humidity, vibration, shock, location, or some other suitable parameter, only one asset tracker device 200 needs to report the data.

FIG. 5B illustrates group reporting schedules 236E, 236F, 236G, 236H for four asset tracker devices 200 (DEVICES5-8). If DEVICE7 corresponds to the asset tracker device 104 and DEVICE8 corresponds to the asset tracker device 106, the reporting management server 130 may select DEVICE7 to communicate the reporting data and idle DEVICE8 as seen in the group reporting schedules 236G, 236H. Providing group reporting schedules 236 that designate only one asset tracker device 200 to communicate redundant data reduces traffic. In some embodiments, the group reporting schedules 236 for the members of the group may be configured to alternate which asset tracker device 200 transmits the redundant data so that the asset tracker devices 200 remain active, but the reporting redundancy is still eliminated as the asset tracker devices 200 alternate idle periods.

Returning to FIG. 3, during operation 304 of the method 300 the asset tracker device 200 receives the group member list 238 from the reporting management server 130. In some embodiments, the operation 304 corresponds to the sending of the configuration message 408 shown in FIG. 4. The group member list 238 identifies each member of the group, for example, based on IMEI or IP address.

During operation 306 of the method 300, the asset tracker device 200 receives the group reporting schedule 236 from the reporting management server 130. In some embodiments, the operation 306 corresponds to the sending of the configuration message 416 shown in FIG. 4.

During operation 308 of the method 300, and at 418 in FIG. 4, the asset tracker device 200 communicates using the group reporting schedule 236. Example communication using the group reporting schedule 236 is illustrated in FIGS. 5A and 5B.

During operation 310 of the method 300, the asset tracker device 200 locally verifies the presence of the group members. As described above, the asset tracker device 200 listens to the link validation messages communicated between other asset tracker devices 200 and their associated external sensors 226. In some embodiments, the link validation messages are communicated over a PAN connection using the communication interface 210. Listening to the link validation messages allows the asset tracker device 200 to passively identify the presence of the other asset tracker devices 200 in the group member list 238 without having to actively send a message or receive an acknowledgement from the other asset tracker device 200. A passive approach conserves power in the asset tracker device 200 and reduces PAN traffic.

During operation 312 of the method 300, the asset tracker device 200 determines if the group is present. In some embodiments, group presence is associated with the asset tracker device 200 detecting at least one of the asset tracker devices 200 in the group member list 238. In some embodiments, the number of group members detected to verify presence may be more than one. A group exit condition is identified when the minimum number of group members not detected.

During operation 314, the asset tracker device 200 sends a group exit message 420 (see FIG. 4) to the reporting management server 130 responsive to the asset tracker device 200 identifying the group exit condition during operation 312. In some embodiments, the asset tracker device 200 also invalidates the group reporting schedule 236 and/or the group member list 238 during operation 314. In some embodiments, the asset tracker device 200 transitions to using the default reporting schedule 234 during operation 314.

Upon receiving the group exit message 420, the reporting management server 130 removes the asset tracker device 200 from the group and returns to 406 in FIG. 4 to determine whether a new group is available for the asset tracker device 200. If a new group is available, the asset tracker device 200 receives a configuration message 408 and the method 300 continues at operation 304. If a new group is not available, the method continues at operation 302 where the asset tracker device 200 communicates using the default reporting schedule 234. In some embodiments, the reporting management server 130 send updated group reporting schedules 236 and group member lists 238 (i.e., with the exiting device removed) to the remaining members of the group.

In some embodiments, a user may disable group coordination for the asset tracker device 200. The user device 132 sends a configuration message 422 to the device monitoring setting database 126 to indicate that coordination is disabled for the asset tracker device 200. The device monitoring setting database 126 sends a service notification message 424 to the reporting management server 130 indicating that the asset tracker device 200 is not a group candidate. The reporting management server 130 sends a configuration message 426 to the asset tracker device 200 to disable group coordination. Responsive to the configuration message 426, the asset tracker device 200 invalidates the group reporting schedule 236 and/or the group member list 238. The method continues at operation 302 where the asset tracker device 200 communicates using the default reporting schedule 234.

The use of the group reporting schedule 236 reduces data usage for sensor data reporting and transmission overhead (due to reduced transmission frequency). Power consumption and cellular network traffic load are reduced due to the reduced number of cellular communication sessions.

Locally determining a group exit using PAN monitoring allows the asset tracker device 200 to detect the group exit more quickly than the central device manager 108 could identify the group exit. For example, the central device manager 108 could identify the group exit based on position information periodically reported by the asset tracker device 200. Since, PAN traffic typically operates at a higher rate than the reporting on the communication network 102, 228, local detection is more efficient. As a result, the central device manager 108 may assign the asset tracker device 200 to a new group more quickly, improving system operation.

According to some embodiments, a method is provided. The method includes receiving a group member list in a device, receiving a group reporting schedule in the device, communicating reporting data by the device using the group reporting schedule, and sending, by the device, a group exit message responsive to determining a group exit condition associated with failing to detect communications from group members specified in the group member list.

According to some embodiments, the method includes communicating reporting data by the device using a default reporting schedule responsive to determining the group exit condition.

According to some embodiments, determining the group exit condition includes monitoring communications by the group members, and determining the group exit condition responsive to failing to detect communications from a predetermined number of the group members.

According to some embodiments, the predetermined number equals all of the group members specified in the group member list.

According to some embodiments, communicating the reporting data includes communicating the reporting data via a first protocol, and monitoring the communications by the group members includes monitoring the communications by the group members via a second protocol different than the first protocol.

According to some embodiments, the first protocol includes one of a cellular protocol or a WiFi protocol, and the second protocol includes a personal area network protocol.

According to some embodiments, the method includes receiving sensor data from an external sensor via the second protocol, and including the sensor data in the reporting data.

According to some embodiments, monitoring the communications by the group members includes monitoring link validation messages sent by the group members.

According to some embodiments, the reporting data includes at least one of temperature data, pressure data, humidity data, vibration data, shock data, location data, or image data.

According to some embodiments, a system is provided. The system includes a memory including instructions, and a processor coupled to the memory, the processor configured to execute the instructions to facilitate performance of operations. The operations include identifying a first group of devices, sending a first group member list identifying members of the first group of devices to a first member of the first group of devices, sending a first group reporting schedule to the first member, receiving reporting data from the first member according to the first group reporting schedule, receiving a group exit message from the first member, and sending a second group member list not including the first member to a second member of the first group of devices.

According to some embodiments, the operations include sending a second group reporting schedule to the second member.

According to some embodiments, the operations include identifying a second group of devices, the second group of devices including the first member, sending a third group member list identifying members of the second group of devices to the first member, sending a second group reporting schedule to the first member, and receiving reporting data from the first member according to the second group reporting schedule.

According to some embodiments, the operations include receiving reporting data from the first member according to a default reporting schedule after receiving the group exit message.

According to some embodiments, the reporting data includes at least one of temperature data, pressure data, humidity data, vibration data, shock data, location data, or image data.

According to some embodiments, a non-transitory computer-readable medium is provided. The non-transitory computer-readable medium stores instructions that when executed facilitate performance of operations. The operations include receiving a group member list in a device via a first protocol, receiving a group reporting schedule in the device via the first protocol, communicating reporting data by the device via the first protocol using to the group reporting schedule, monitoring communications by devices specified in the group member list via a second protocol, and sending, by the device, a group exit message via the first protocol responsive to failing to detect communications by one or more of the devices specified in the group member list.

According to some embodiments, the operations include communicating reporting data by the device via the first protocol using a default reporting schedule after sending the group exit message.

According to some embodiments, the first protocol includes one of a cellular protocol or a WiFi protocol, and the second protocol includes a personal area network protocol.

According to some embodiments, monitoring the communications by the devices specified in the group member list includes monitoring link validation messages sent by the group members.

According to some embodiments, the operations include receiving sensor data from an external sensor via the second protocol, and including the sensor data in the reporting data.

According to some embodiments, the reporting data includes at least one of temperature data, pressure data, humidity data, vibration data, shock data, location data, or image data.

Figure 6:
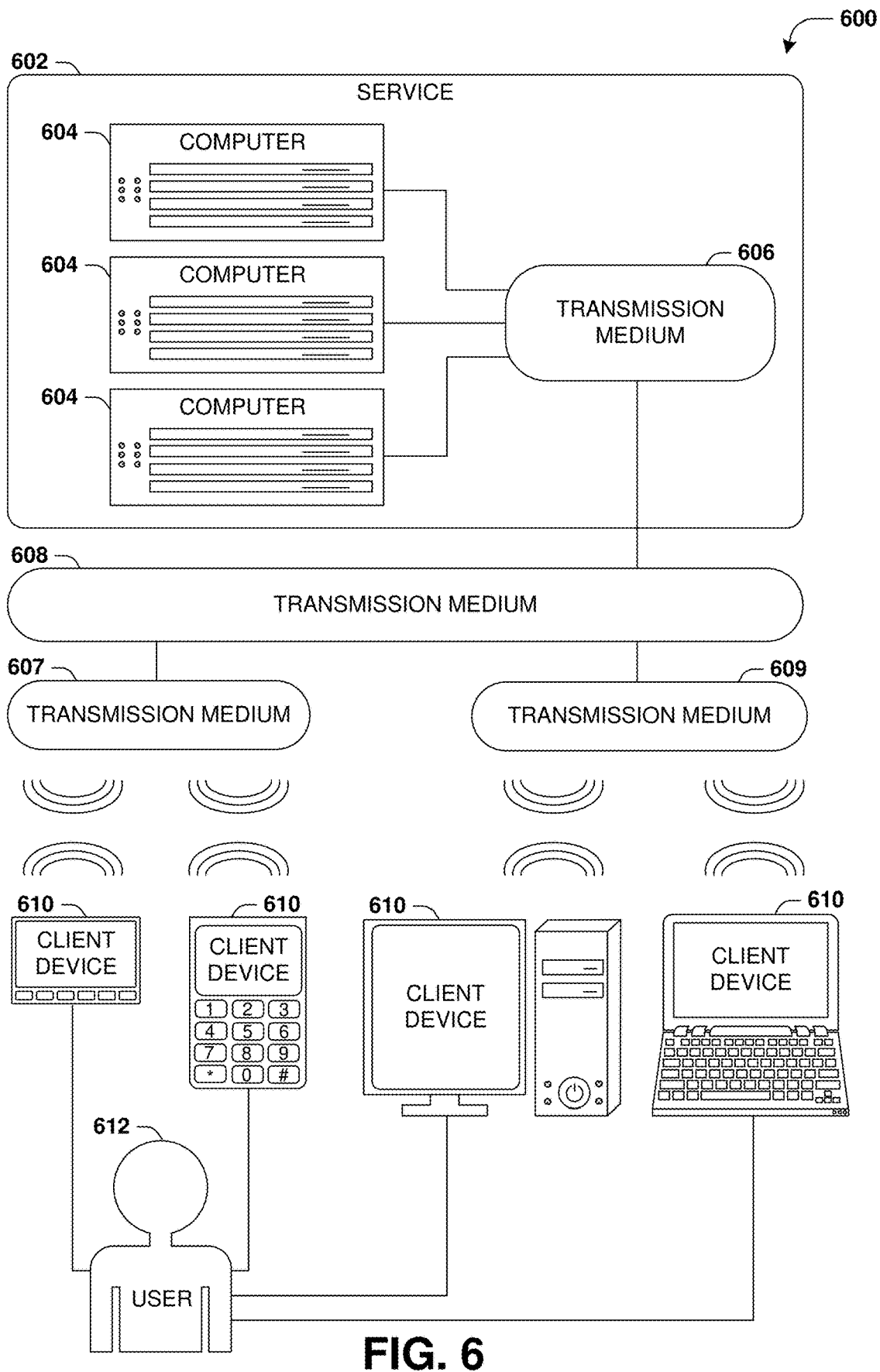
FIG. 6 is an illustration of a scenario involving various examples of transmission mediums that may be used to communicatively couple computers and clients.

FIG. 6 is an interaction diagram of a scenario 600 illustrating a service 602 provided by a set of computers 604 to a set of client devices 610 via various types of transmission mediums. The computers 604 and/or client devices 610 may be capable of transmitting, receiving, processing, and/or storing many types of signals, such as in memory as physical memory states.

The computers 604 of the service 602 may be communicatively coupled together, such as for exchange of communications using a transmission medium 606. The transmission medium 606 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 602.

Likewise, the transmission medium 606 may comprise one or more sub-networks, such as may employ different architectures, may be compliant or compatible with differing protocols and/or may interoperate within the transmission medium 606. Additionally, various types of transmission medium 606 may be interconnected (e.g., a router may provide a link between otherwise separate and independent transmission medium 606).

In scenario 600 of FIG. 6, the transmission medium 606 of the service 602 is connected to a transmission medium 608 that allows the service 602 to exchange data with other services 602 and/or client devices 610. The transmission medium 608 may encompass various combinations of devices with varying levels of distribution and exposure, such as a public wide-area network and/or a private network (e.g., a virtual private network (VPN) of a distributed enterprise).

In the scenario 600 of FIG. 6, the service 602 may be accessed via the transmission medium 608 by a user 612 of one or more client devices 610, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 610 may communicate with the service 602 via various communicative couplings to the transmission medium 608. As a first such example, one or more client devices 610 may comprise a cellular communicator and may communicate with the service 602 by connecting to the transmission medium 608 via a transmission medium 607 provided by a cellular provider. As a second such example, one or more client devices 610 may communicate with the service 602 by connecting to the transmission medium 608 via a transmission medium 609 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the computers 604 and the client devices 610 may communicate over various types of transmission mediums.

Figure 7:
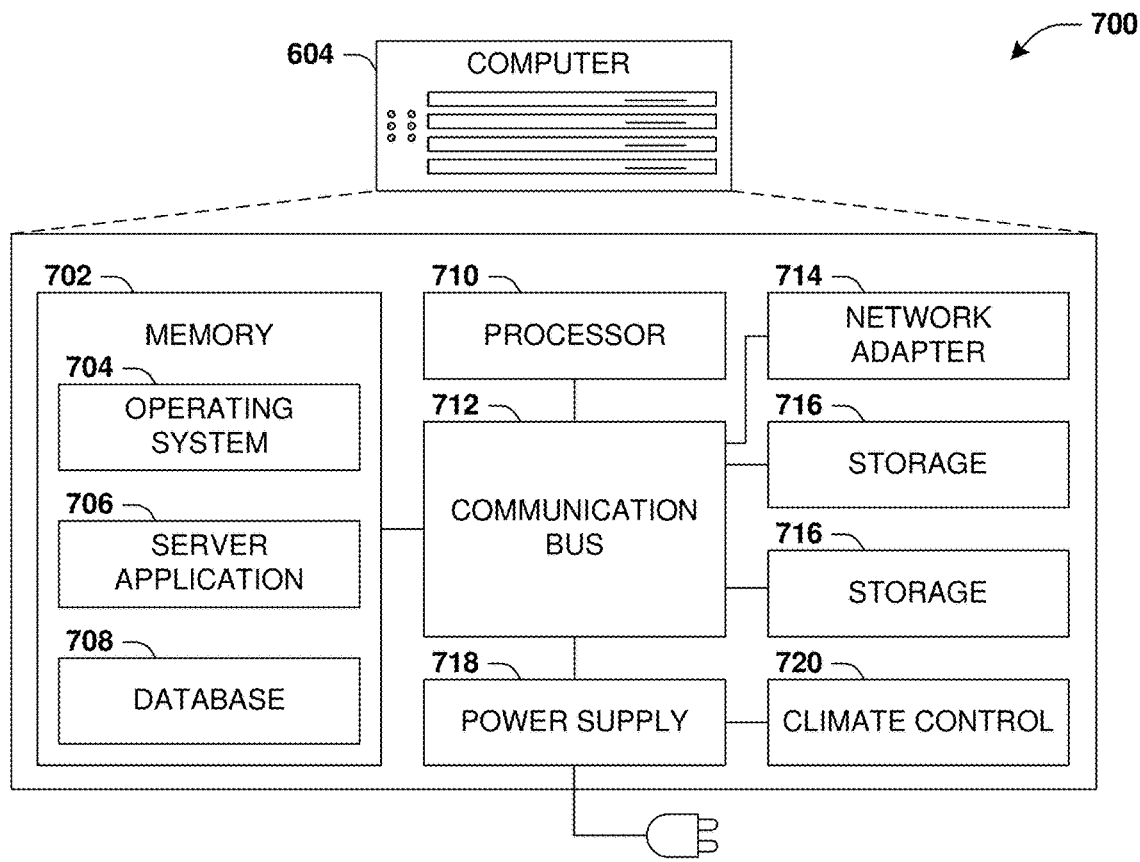
FIG. 7 is an illustration of a scenario involving an example configuration of a computer that may utilize and/or implement at least a portion of the techniques presented herein.

FIG. 7 presents a schematic architecture diagram 700 of a computer 604 that may utilize at least a portion of the techniques provided herein. Such a computer 604 may vary widely in configuration or capabilities, alone or in conjunction with other computers, in order to provide a service such as the service 602.

The computer 604 may comprise one or more processors 710 that process instructions. The one or more processors 710 may optionally include a plurality of cores; one or more coprocessors, such as a mathematics coprocessor or an integrated graphical processing unit (GPU); and/or one or more layers of local cache memory. The computer 604 may comprise memory 702 storing various forms of applications, such as an operating system 704; one or more computer applications 706; and/or various forms of data, such as a database 708 or a file system. The computer 604 may comprise a variety of peripheral components, such as a wired and/or wireless network adapter 714 connectible to a local area network and/or wide area network; one or more storage components 716, such as a hard disk drive, a solid-state storage device (SSD), a flash memory device, and/or a magnetic and/or optical disk reader.

The computer 604 may comprise a mainboard featuring one or more communication buses 712 that interconnect the processor 710, the memory 702, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 712 may interconnect the computer 604 with at least one other computer. Other components that may optionally be included with the computer 604 (though not shown in the schematic architecture diagram 700 of FIG. 7) include a display; a display adapter, such as a graphical processing unit (GPU); input peripherals, such as a keyboard and/or mouse; and a flash memory device that may store a basic input/output system (BIOS) routine that facilitates booting the computer 604 to a state of readiness.

The computer 604 may operate in various physical enclosures, such as a desktop or tower, and/or may be integrated with a display as an "all-in-one" device. The computer 604 may be mounted horizontally and/or in a cabinet or rack, and/or may simply comprise an interconnected set of components. The computer 604 may comprise a dedicated and/or shared power supply 718 that supplies and/or regulates power for the other components. The computer 604 may provide power to and/or receive power from another computer and/or other devices. The computer 604 may comprise a shared and/or dedicated climate control unit 720 that regulates climate properties, such as temperature, humidity, and/or airflow. Many such computers 604 may be configured and/or adapted to utilize at least a portion of the techniques presented herein.

Figure 8:
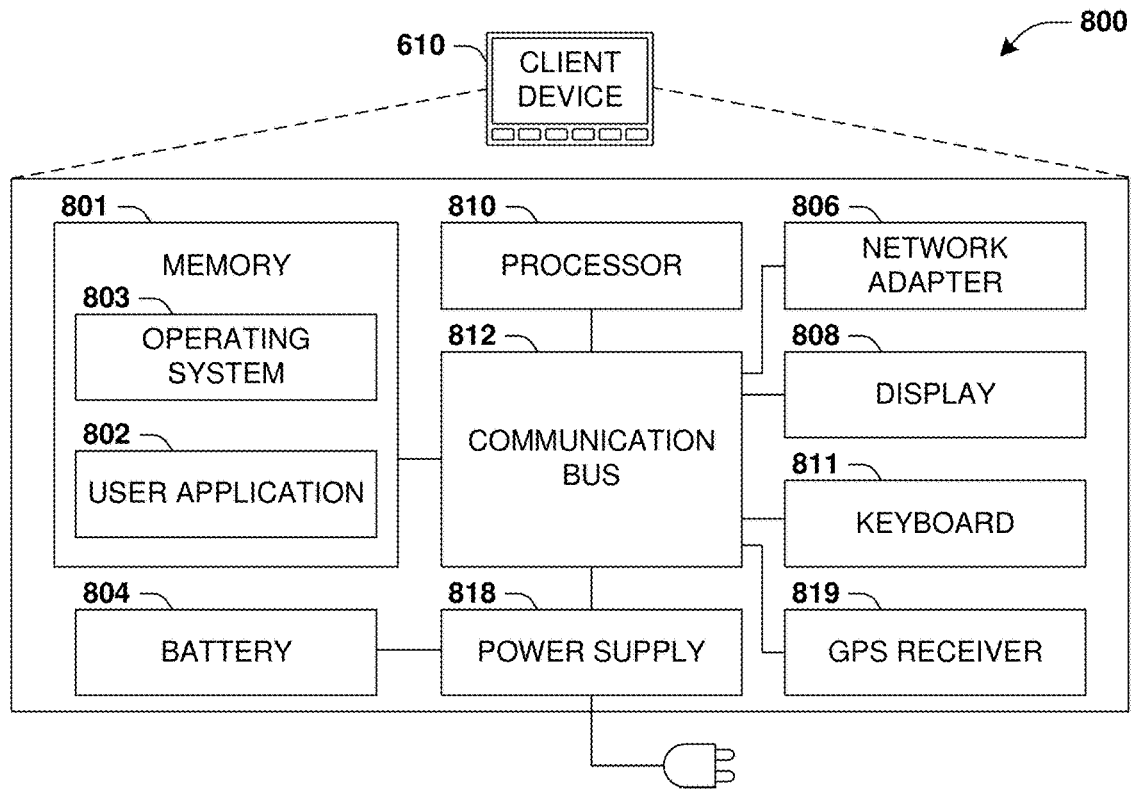
FIG. 8 is an illustration of a scenario involving an example configuration of a client that may utilize and/or implement at least a portion of the techniques presented herein.

FIG. 8 presents a schematic architecture diagram 800 of a client device 610 whereupon at least a portion of the techniques presented herein may be implemented. Such a client device 610 may vary widely in configuration or capabilities, in order to provide a variety of functionality to a user such as the user 612. The client device 610 may be provided in a variety of form factors, such as a desktop or tower workstation; an "all-in-one" device integrated with a display 808; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 610 may serve the user in a variety of roles, such as a workstation, kiosk, media player, gaming device, and/or appliance.

The client device 610 may comprise one or more processors 810 that process instructions. The one or more processors 810 may optionally include a plurality of cores; one or more coprocessors, such as a mathematics coprocessor or an integrated graphical processing unit (GPU); and/or one or more layers of local cache memory. The client device 610 may comprise memory 801 storing various forms of applications, such as an operating system 803; one or more user applications 802, such as document applications, media applications, file and/or data access applications, communication applications such as web browsers and/or email clients, utilities, and/or games; and/or drivers for various peripherals. The client device 610 may comprise a variety of peripheral components, such as a wired and/or wireless network adapter 806 connectible to a local area network and/or wide area network; one or more output components, such as a display 808 coupled with a display adapter (optionally including a graphical processing unit (GPU)), a sound adapter coupled with a speaker, and/or a printer; input devices for receiving input from the user, such as a keyboard 811, a mouse, a microphone, a camera, and/or a touch-sensitive component of the display 808; and/or environmental sensors, such as a global positioning system (GPS) receiver 819 that detects the location, velocity, and/or acceleration of the client device 610, a compass, accelerometer, and/or gyroscope that detects a physical orientation of the client device 610. Other components that may optionally be included with the client device 610 (though not shown in the schematic architecture diagram 800 of FIG. 8) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 610 to a state of readiness; and a climate control unit that regulates climate properties, such as temperature, humidity, and airflow.

The client device 610 may comprise a mainboard featuring one or more communication buses 812 that interconnect the processor 810, the memory 801, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 610 may comprise a dedicated and/or shared power supply 818 that supplies and/or regulates power for other components, and/or a battery 804 that stores power for use while the client device 610 is not connected to a power source via the power supply 818. The client device 610 may provide power to and/or receive power from other client devices.

Figure 9:
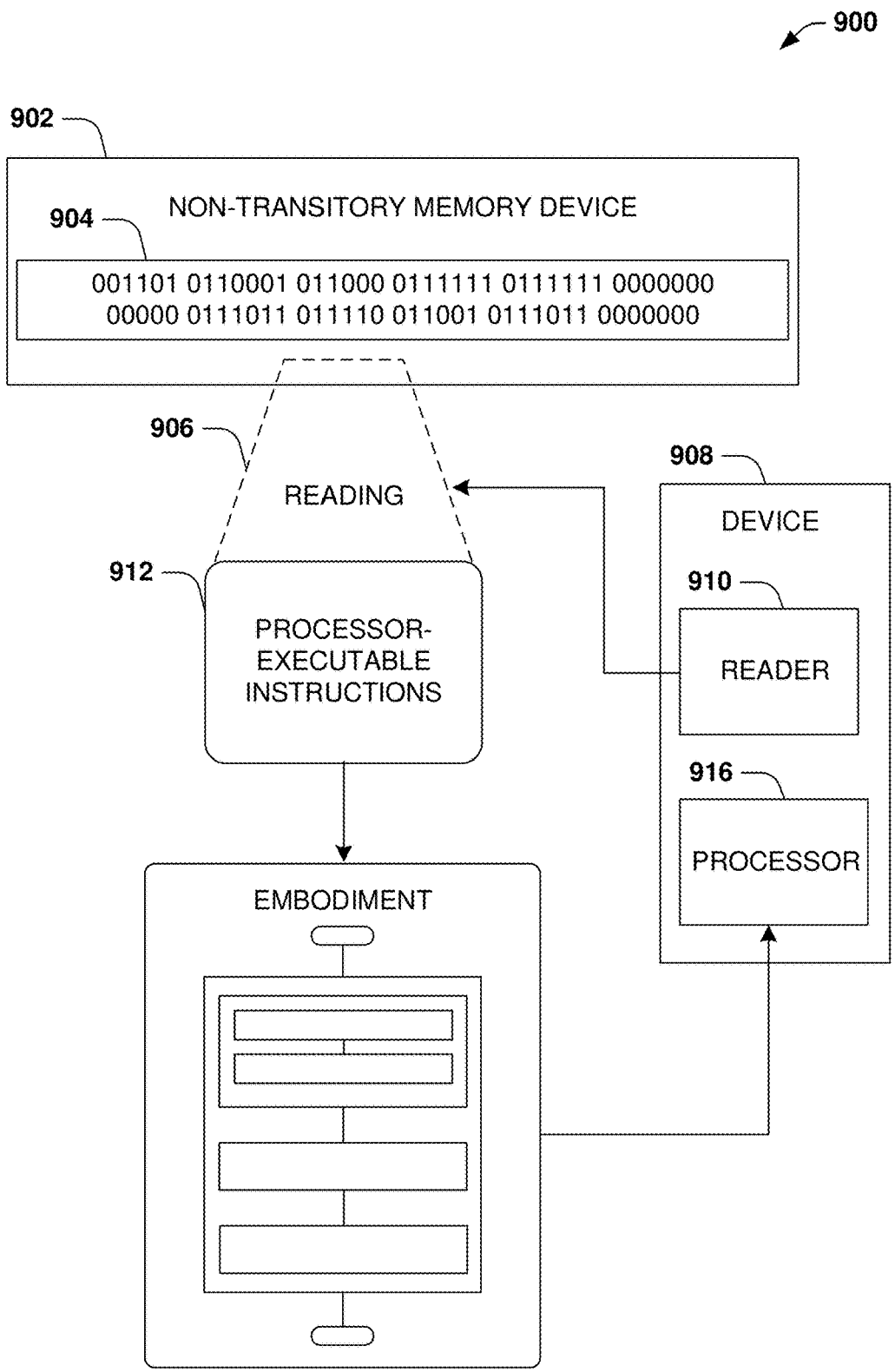
FIG. 9 is an illustration of a scenario featuring an example non-transitory machine readable medium in accordance with one or more of the provisions set forth herein.

FIG. 9 is an illustration of a scenario 900 involving an example non-transitory machine readable medium 902. The non-transitory machine readable medium 902 may comprise processor-executable instructions 912 that when executed by a processor 916 cause performance (e.g., by the processor 916) of at least some of the provisions herein. The non-transitory machine readable medium 902 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 902 stores computer-readable data 904 that, when subjected to reading 906 by a reader 910 of a device 908 (e.g., a read head of a hard disk drive, or a read operation invoked on a solid-state storage device), express the processor-executable instructions 912. In some embodiments, the processor-executable instructions 912, when executed cause performance of operations, such as at least some of the example method 300 of FIG. 3, for example. In some embodiments, the processor-executable instructions 912 are configured to cause implementation of a system, such as at least some of the example network environment 101 of FIG. 1, for example.

Figure 10:
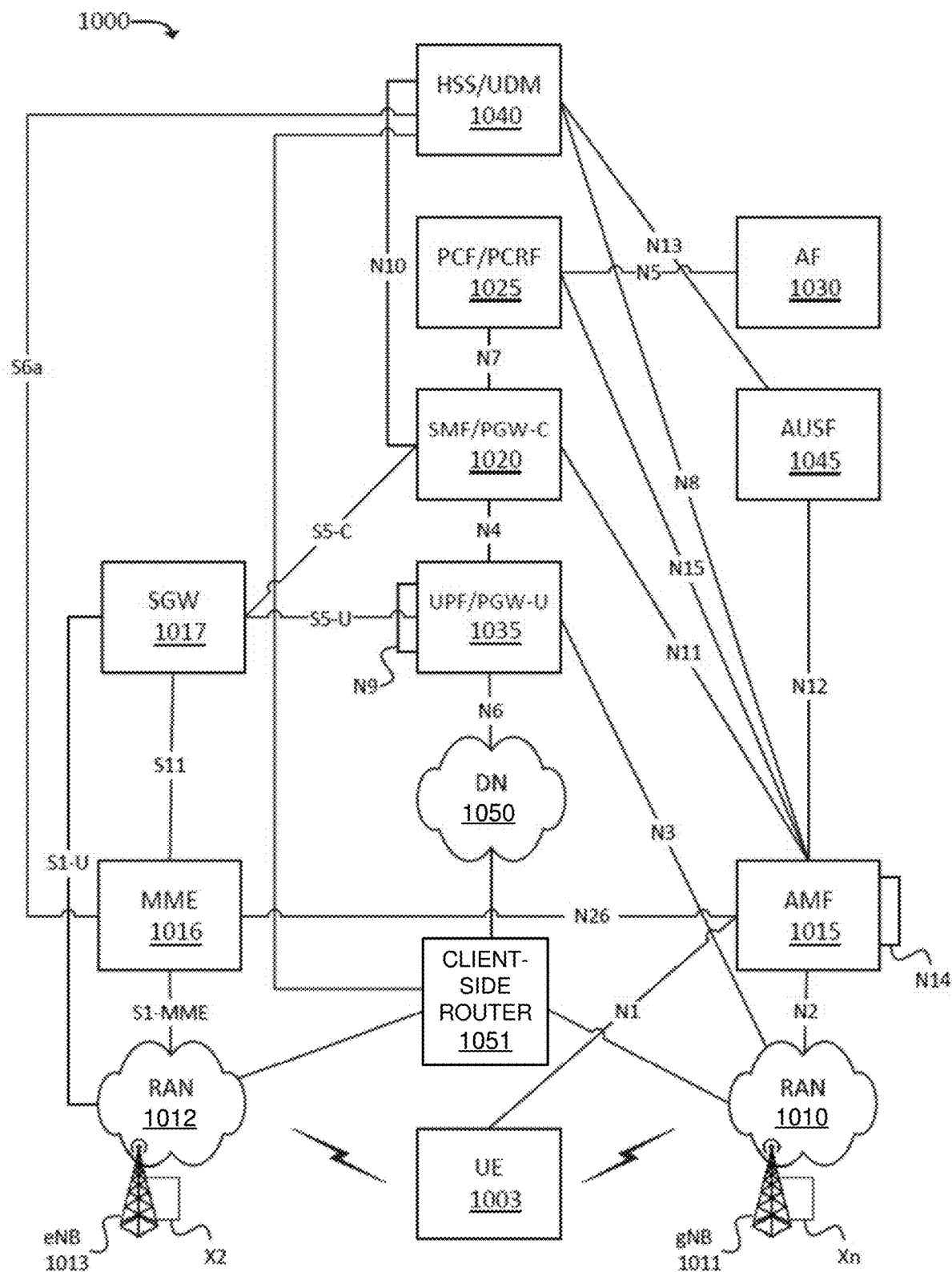
FIG. 10 is an illustration of an example environment in which at least a portion of the techniques presented herein may be utilized and/or implemented.

FIG. 10 illustrates an example environment 1000, in which one or more embodiments may be implemented. In some embodiments, environment 1000 may correspond to a Fifth Generation ("5G") network, and/or may include elements of a 5G network. In some embodiments, environment 1000 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 1000 may include UE 1003, RAN 1010 (which may include one or more Next Generation Node Bs ("gNBs") 1011), RAN 1012 (which may include one or more one or more evolved Node Bs ("eNBs") 1013), and various network functions such as Access and Mobility Management Function ("AMF") 1015, Mobility Management Entity ("MME") 1016, Serving Gateway ("SGW") 1017, Session Management Function ("SMF")/Packet Data Network ("PDN") Gateway ("PGW")-Control plane function ("PGW-C") 1020, Policy Control Function ("PCF")/Policy Charging and Rules Function ("PCRF") 1025, Application Function ("AF") 1030, User Plane Function ("UPF")/PGW-User plane function ("PGW-U") 1035, Home Subscriber Server ("HSS")/Unified Data Management ("UDM") 1040, and Authentication Server Function ("AUSF") 1045. Environment 1000 may also include one or more networks, such as Data Network ("DN") 1050. Environment 1000 may include one or more additional devices or systems communicatively coupled to one or more networks (e.g., DN 1050), such as client-side router 1051.

The example shown in FIG. 10 illustrates one instance of each network component or function (e.g., one instance of SMF/PGW-C 1020, PCF/PCRF 1025, UPF/PGW-U 1035, HSS/UDM 1040, and/or 1045). In practice, environment 1000 may include multiple instances of such components or functions. For example, in some embodiments, environment 1000 may include multiple "slices" of a core network, where each slice includes a discrete set of network functions (e.g., one slice may include a first instance of SMF/PGW-C 1020, PCF/PCRF 1025, UPF/PGW-U 1035, HSS/UDM 1040, and/or 1045, while another slice may include a second instance of SMF/PGW-C 1020, PCF/PCRF 1025, UPF/PGW-U 1035, HSS/UDM 1040, and/or 1045). The different slices may provide differentiated levels of service, such as service in accordance with different Quality of Service ("QoS") parameters.

The quantity of devices and/or networks, illustrated in FIG. 10, is provided for explanatory purposes only. In practice, environment 1000 may include additional devices and/or networks, fewer devices and/or networks, different devices and/or networks, or differently arranged devices and/or networks than illustrated in FIG. 10. For example, while not shown, environment 1000 may include devices that facilitate or enable communication between various components shown in environment 1000, such as routers, modems, gateways, switches, hubs, etc. Alternatively and/or additionally, one or more of the devices of environment 1000 may perform one or more network functions described as being performed by another one or more of the devices of environment 1000. Devices of environment 1000 may interconnect with each other and/or other devices via wired connections, wireless connections, or a combination of wired and wireless connections. In some implementations, one or more devices of environment 1000 may be physically integrated in, and/or may be physically attached to, one or more other devices of environment 1000.

UE 1003 may include a computation and communication device, such as a wireless mobile communication device that is capable of communicating with RAN 1010, RAN 1012, and/or DN 1050. UE 1003 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 1003 may send traffic to and/or receive traffic (e.g., user plane traffic) from DN 1050 via RAN 1010, RAN 1012, and/or UPF/PGW-U 1035.

RAN 1010 may be, or may include, a 5G RAN that includes one or more base stations (e.g., one or more gNBs 1011), via which UE 1003 may communicate with one or more other elements of environment 1000. UE 1003 may communicate with RAN 1010 via an air interface (e.g., as provided by gNB 1011). For instance, RAN 1010 may receive traffic (e.g., voice call traffic, data traffic, messaging traffic, signaling traffic, etc.) from UE 1003 via the air interface, and may communicate the traffic to UPF/PGW-U 1035, and/or one or more other devices or networks. Similarly, RAN 1010 may receive traffic intended for UE 1003 (e.g., from UPF/PGW-U 1035, AMF 1015, and/or one or more other devices or networks) and may communicate the traffic to UE 1003 via the air interface.

RAN 1012 may be, or may include, a LTE RAN that includes one or more base stations (e.g., one or more eNBs 1013), via which UE 1003 may communicate with one or more other elements of environment 1000. UE 1003 may communicate with RAN 1012 via an air interface (e.g., as provided by eNB 1013). For instance, RAN 1010 may receive traffic (e.g., voice call traffic, data traffic, messaging traffic, signaling traffic, etc.) from UE 1003 via the air interface, and may communicate the traffic to UPF/PGW-U 1035, and/or one or more other devices or networks. Similarly, RAN 1010 may receive traffic intended for UE 1003 (e.g., from UPF/PGW-U 1035, SGW 1017, and/or one or more other devices or networks) and may communicate the traffic to UE 1003 via the air interface.

AMF 1015 may include one or more devices, systems, Virtualized Network Functions ("VNFs"), etc., that perform operations to register UE 1003 with the 5G network, to establish bearer channels associated with a session with UE 1003, to hand off UE 1003 from the 5G network to another network, to hand off UE 1003 from the other network to the 5G network, manage mobility of UE 1003 between RANs 1010 and/or gNBs 1011, and/or to perform other operations. In some embodiments, the 5G network may include multiple AMFs 1015, which communicate with each other via the N14 interface (denoted in FIG. 10 by the line marked "N14" originating and terminating at AMF 1015).

MME 1016 may include one or more devices, systems, VNFs, etc., that perform operations to register UE 1003 with the EPC, to establish bearer channels associated with a session with UE 1003, to hand off UE 1003 from the EPC to another network, to hand off UE 1003 from another network to the EPC, manage mobility of UE 1003 between RANs 1012 and/or eNBs 1013, and/or to perform other operations.

SGW 1017 may include one or more devices, systems, VNFs, etc., that aggregate traffic received from one or more eNBs 1013 and send the aggregated traffic to an external network or device via UPF/PGW-U 1035. Additionally, SGW 1017 may aggregate traffic received from one or more UPF/PGW-Us 1035 and may send the aggregated traffic to one or more eNBs 1013. SGW 1017 may operate as an anchor for the user plane during inter-eNB handovers and as an anchor for mobility between different telecommunication networks or RANs (e.g., RANs 1010 and 1012).

SMF/PGW-C 1020 may include one or more devices, systems, VNFs, etc., that gather, process, store, and/or provide information in a manner described herein. SMF/PGW-C 1020 may, for example, facilitate in the establishment of communication sessions on behalf of UE 1003. In some embodiments, the establishment of communications sessions may be performed in accordance with one or more policies provided by PCF/PCRF 1025.

PCF/PCRF 1025 may include one or more devices, systems, VNFs, etc., that aggregate information to and from the 5G network and/or other sources. PCF/PCRF 1025 may receive information regarding policies and/or subscriptions from one or more sources, such as subscriber databases and/or from one or more users (such as, for example, an administrator associated with PCF/PCRF 1025).

AF 1030 may include one or more devices, systems, VNFs, etc., that receive, store, and/or provide information that may be used in determining parameters (e.g., quality of service parameters, charging parameters, or the like) for certain applications.

UPF/PGW-U 1035 may include one or more devices, systems, VNFs, etc., that receive, store, and/or provide data (e.g., user plane data). For example, UPF/PGW-U 1035 may receive user plane data (e.g., voice call traffic, data traffic, etc.), destined for UE 1003, from DN 1050, and may forward the user plane data toward UE 1003 (e.g., via RAN 1010, SMF/PGW-C 1020, and/or one or more other devices). In some embodiments, multiple UPFs 1035 may be deployed (e.g., in different geographical locations), and the delivery of content to UE 1003 may be coordinated via the N9 interface (e.g., as denoted in FIG. 10 by the line marked "N9" originating and terminating at UPF/PGW-U 1035). Similarly, UPF/PGW-U 1035 may receive traffic from UE 1003 (e.g., via RAN 1010, SMF/PGW-C 1020, and/or one or more other devices), and may forward the traffic toward DN 1050. In some embodiments, UPF/PGW-U 1035 may communicate (e.g., via the N4 interface) with SMF/PGW-C 1020, regarding user plane data processed by UPF/PGW-U 1035.

HSS/UDM 1040 and AUSF 1045 may include one or more devices, systems, VNFs, etc., that manage, update, and/or store, in one or more memory devices associated with AUSF 1045 and/or HSS/UDM 1040, profile information associated with a subscriber. AUSF 1045 and/or HSS/UDM 1040 may perform authentication, authorization, and/or accounting operations associated with the subscriber and/or a communication session with UE 1003.

DN 1050 may include one or more wired and/or wireless networks. For example, DN 1050 may include an Internet Protocol ("IP")-based PDN, a wide area network ("WAN") such as the Internet, a private enterprise network, and/or one or more other networks. UE 1003 may communicate, through DN 1050, with data servers, other UEs UE 1003, and/or to other servers or applications that are coupled to DN 1050. DN 1050 may be connected to one or more other networks, such as a public switched telephone network ("PSTN"), a public land mobile network ("PLMN"), and/or another network. DN 1050 may be connected to one or more devices, such as content providers, applications, web servers, and/or other devices, with which UE 1003 may communicate.

The client-side router 1051 may include one or more devices, systems, VNFs, etc., that perform one or more operations described herein. For example, the client-side router 1051 may monitor and/or analyze video stream chunks and/or statuses associated with video stream chunks to check for quality issues and/or may deliver video stream chunks to UE 1003.

Figure 11:
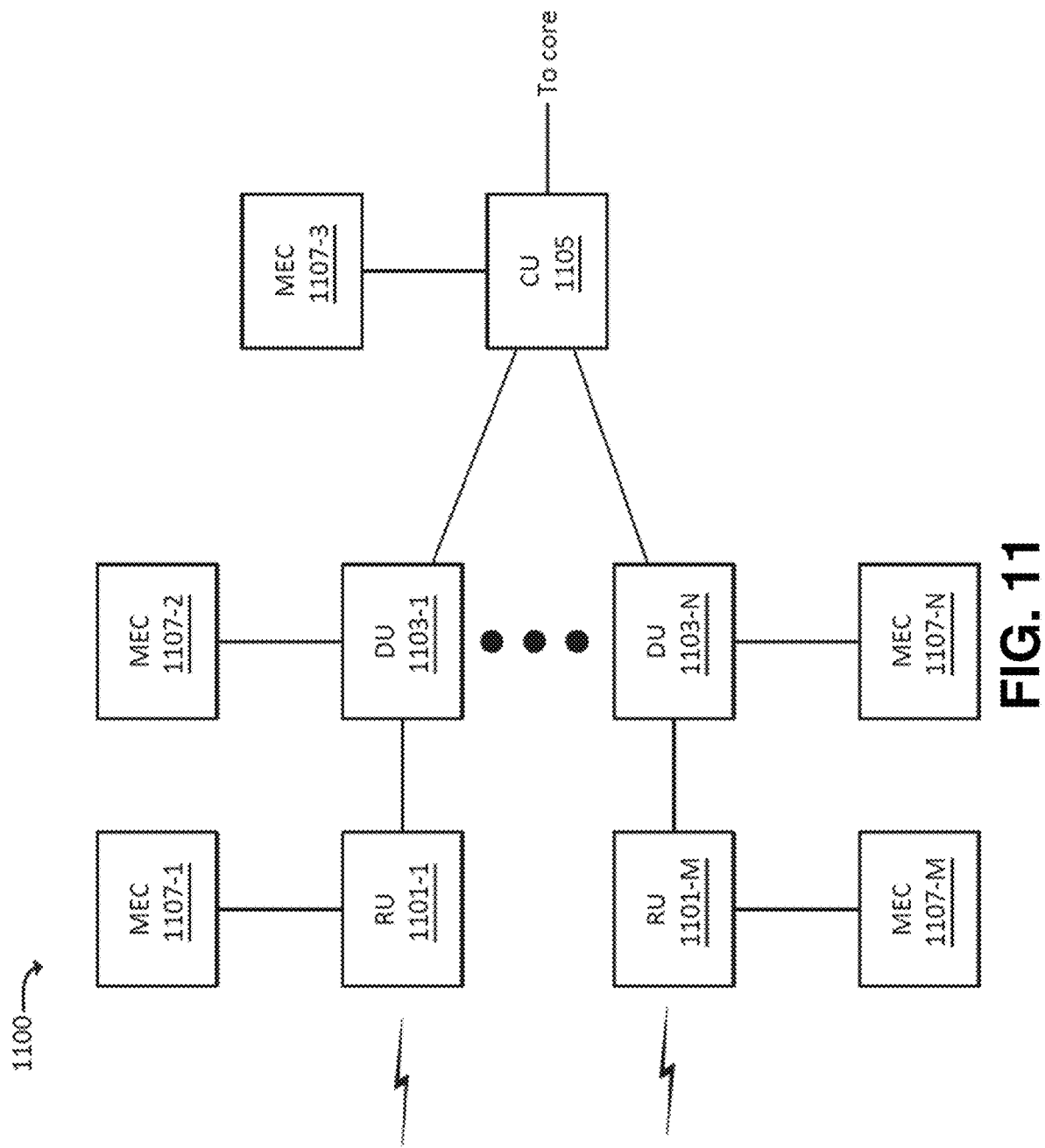
FIG. 11 is an illustration of an example network that may utilize and/or implement at least a portion of the techniques presented herein.

FIG. 11 illustrates an example Distributed Unit ("DU") network 1100, which may be included in and/or implemented by one or more RANs (e.g., RAN 1010, RAN 1012, or some other RAN). In some embodiments, a particular RAN may include one DU network 1100. In some embodiments, a particular RAN may include multiple DU networks 1100. In some embodiments, DU network 1100 may correspond to a particular gNB 1011 of a 5G RAN (e.g., RAN 1010). In some embodiments, DU network 1100 may correspond to multiple gNBs 1011. In some embodiments, DU network 1100 may correspond to one or more other types of base stations of one or more other types of RANs. As shown, DU network 1100 may include Central Unit ("CU") 1105, one or more Distributed Units ("DUs") 1103-1 through 1103-N (referred to individually as "DU 1103," or collectively as "DUs 1103"), and one or more Radio Units ("RUs") 1101-1 through 1101-M (referred to individually as "RU 1101," or collectively as "RUs 1101").

CU 1105 may communicate with a core of a wireless network (e.g., may communicate with one or more of the devices or systems described above with respect to FIG. 10, such as AMF 1015 and/or UPF/PGW-U 1035). In the uplink direction (e.g., for traffic from UEs UE 1003 to a core network), CU 1105 may aggregate traffic from DUs 1103, and forward the aggregated traffic to the core network. In some embodiments, CU 1105 may receive traffic according to a given protocol (e.g., Radio Link Control ("RLC")) from DUs 1103, and may perform higher-layer processing (e.g., may aggregate/process RLC packets and generate Packet Data Convergence Protocol ("PDCP") packets based on the RLC packets) on the traffic received from DUs 1103.

In accordance with some embodiments, CU 1105 may receive downlink traffic (e.g., traffic from the core network) for a particular UE 1003, and may determine which DU(s) 1103 should receive the downlink traffic. DU 1103 may include one or more devices that transmit traffic between a core network (e.g., via CU 1105) and UE 1003 (e.g., via a respective RU 1101). DU 1103 may, for example, receive traffic from RU 1101 at a first layer (e.g., physical ("PHY") layer traffic, or lower PHY layer traffic), and may process/aggregate the traffic to a second layer (e.g., upper PHY and/or RLC). DU 1103 may receive traffic from CU 1105 at the second layer, may process the traffic to the first layer, and provide the processed traffic to a respective RU 1101 for transmission to UE 1003.

RU 1101 may include hardware circuitry (e.g., one or more RF transceivers, antennas, radios, and/or other suitable hardware) to communicate wirelessly (e.g., via an RF interface) with one or more UEs UE 1003, one or more other DUs 1103 (e.g., via RUs 1101 associated with DUs 1103), and/or any other suitable type of device. In the uplink direction, RU 1101 may receive traffic from UE 1003 and/or another DU 1103 via the RF interface and may provide the traffic to DU 1103. In the downlink direction, RU 1101 may receive traffic from DU 1103, and may provide the traffic to UE 1003 and/or another DU 1103.

RUs 1101 may, in some embodiments, be communicatively coupled to one or more Multi-Access/Mobile Edge Computing ("MEC") devices, referred to sometimes herein simply as ("MECs") 1107. For example, RU 1101-1 may be communicatively coupled to MEC 1107-1, RU 1101-M may be communicatively coupled to MEC 1107-M, DU 1103-1 may be communicatively coupled to MEC 1107-2, DU 1103-N may be communicatively coupled to MEC 1107-N, CU 1105 may be communicatively coupled to MEC 1107-3, and so on. MECs 1107 may include hardware resources (e.g., configurable or provisionable hardware resources) that may be configured to provide services and/or otherwise process traffic to and/or from UE 1003, via a respective RU 1101.

For example, RU 1101-1 may route some traffic, from UE 1003, to MEC 1107-1 instead of to a core network (e.g., via DU 1103 and CU 1105). MEC 1107-1 may process the traffic, perform one or more computations based on the received traffic, and may provide traffic to UE 1003 via RU 1101-1. In this manner, ultra-low latency services may be provided to UE 1003, as traffic does not need to traverse DU 1103, CU 1105, and an intervening backhaul network between DU network 1100 and the core network. In some embodiments, MEC 1107 may include, and/or may implement some or all of the functionality described above with respect to the client-side router 1051, the client-side router 106 and/or at least one cache node of the cache system 104 (such as the first cache node 112 and/or the second cache node 114).

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
   receiving a group member list in a device;
   receiving a group reporting schedule in the device;
   communicating reporting data by the device using the group reporting schedule;
   determining, by the device, a group exit condition associated with failing to detect communications from group members specified in the group member list; and
   sending, by the device that determined the group exit condition, a group exit message to a reporting management server responsive to determining the group exit condition associated with failing to detect communications from the group members.

2. The method of claim 1, comprising:
   communicating reporting data by the device using a default reporting schedule responsive to determining the group exit condition.

3. The method of claim 1, wherein:
   determining the group exit condition comprises:
      monitoring communications by the group members; and
      determining the group exit condition responsive to failing to detect communications from a predetermined number of the group members.

4. The method of claim 3, wherein the predetermined number equals all of the group members specified in the group member list.

5. The method of claim 3, wherein:
communicating the reporting data comprises communicating the reporting data via a first protocol; and
monitoring the communications by the group members comprises monitoring the communications by the group members via a second protocol different than the first protocol.

6. The method of claim 5, wherein:
the first protocol comprises one of a cellular protocol or a WiFi protocol, and
the second protocol comprises a personal area network protocol.

7. The method of claim 5, comprising:
receiving sensor data from an external sensor via the second protocol; and
including the sensor data in the reporting data.

8. The method of claim 3, wherein:
monitoring the communications by the group members comprises monitoring link validation messages sent by the group members.

9. The method of claim 1, wherein:
the reporting data comprises at least one of temperature data, pressure data, humidity data, vibration data, shock data, location data, or image data.

10. A system comprising:
a memory comprising instructions; and
a processor coupled to the memory, the processor configured to execute the instructions to facilitate performance of operations comprising:
receiving a group member list;
receiving a group reporting schedule;
communicating reporting data by a device using the group reporting schedule;
determining a group exit condition associated with failing to detect communications from group members specified in the group member list; and
sending a group exit message to a reporting management server responsive to determining the group exit condition associated with failing to detect communications from the group members.

11. The system of claim 10, wherein the operations comprise:
communicating reporting data by the device using a default reporting schedule responsive to determining the group exit condition.

12. The system of claim 10, wherein:
determining the group exit condition comprises:
monitoring communications by the group members; and
determining the group exit condition responsive to failing to detect communications from a predetermined number of the group members.

13. The system of claim 12, wherein the predetermined number equals all of the group members specified in the group member list.

14. The system of claim 12, wherein:
communicating the reporting data comprises communicating the reporting data via a first protocol; and
monitoring the communications by the group members comprises monitoring the communications by the group members via a second protocol different than the first protocol.

15. A non-transitory computer-readable medium storing instructions that when executed facilitate performance of operations comprising:
receiving a group member list in a device via a first protocol;
receiving a group reporting schedule in the device via the first protocol;
communicating reporting data by the device via the first protocol using to the group reporting schedule;
monitoring communications by devices specified in the group member list via a second protocol;
determining, by the device, a failure to detect communications by one or more of the devices specified in the group member list; and
sending, by the device that determined the failure to detect communications, a group exit message to a reporting management server via the first protocol responsive to determining the failure to detect communications by the one or more of the devices.

16. The non-transitory computer-readable medium of claim 15, wherein the operations comprise:
communicating reporting data by the device via the first protocol using a default reporting schedule after sending the group exit message.

17. The non-transitory computer-readable medium of claim 15, wherein:
the first protocol comprises one of a cellular protocol or a WiFi protocol, and
the second protocol comprises a personal area network protocol.

18. The non-transitory computer-readable medium of claim 15, wherein:
monitoring the communications by the devices specified in the group member list comprises monitoring link validation messages sent by the devices specified in the group member list.

19. The non-transitory computer-readable medium of claim 15, wherein the operations comprise:
receiving sensor data from an external sensor via the second protocol; and
including the sensor data in the reporting data.

20. The non-transitory computer-readable medium of claim 15, wherein:
the reporting data comprises at least one of temperature data, pressure data, humidity data, vibration data, shock data, location data, or image data.

* * * * *